US012678945B2

(12) United States Patent
Yokoya

(10) Patent No.: US 12,678,945 B2
(45) Date of Patent: Jul. 14, 2026

(54) ESTIMATION OF EXTERNAL FORCE FOR ROBOT CONTROL

(71) Applicant: KABUSHIKI KAISHA YASKAWA DENKI, Kitakyushu (JP)

(72) Inventor: Tsuyoshi Yokoya, Fukuoka (JP)

( * ) Notice: Subject to any disclaimer, the term of this patent is extended or adjusted under 35 U.S.C. 154(b) by 52 days.

(21) Appl. No.: 18/780,486

(22) Filed: Jul. 23, 2024

(65) Prior Publication Data

US 2024/0375276 A1     Nov. 14, 2024

Related U.S. Application Data

(63) Continuation of application No. PCT/JP2022/006218, filed on Feb. 16, 2022.

(51) Int. Cl.
*B25J 9/16*          (2006.01)
*B25J 13/08*         (2006.01)
(52) U.S. Cl.
CPC ............. B25J 9/163 (2013.01); B25J 9/1653 (2013.01); B25J 13/085 (2013.01)
(58) Field of Classification Search
CPC ........ B25J 9/163; B25J 9/1653; B25J 13/085; B25J 9/1633; B25J 13/00
See application file for complete search history.

(56) References Cited

U.S. PATENT DOCUMENTS

| | | | |
|---|---|---|---|
| 2012/0000891 A1 | 1/2012 | Nakanishi et al. | |
| 2012/0022690 A1 | 1/2012 | Ooga et al. | |
| 2016/0221189 A1* | 8/2016 | Nilsson | ................. B25J 9/1653 |

| | | | |
|---|---|---|---|
| 2018/0126553 A1* | 5/2018 | Corkum | ................. B25J 9/1697 |
| 2022/0134553 A1 | 5/2022 | Shimamoto et al. | |
| 2022/0378525 A1* | 12/2022 | Yajima | ................... B25J 13/089 |

FOREIGN PATENT DOCUMENTS

| | | |
|---|---|---|
| JP | 2012-011403 | 1/2012 |
| JP | 2012-024877 | 2/2012 |
| JP | 2021-049597 | 4/2021 |
| WO | 2021/009903 | 1/2021 |

OTHER PUBLICATIONS

International Search Report dated Apr. 26, 2022 for PCT/JP2022/006218.
International Preliminary Report on Patentability with Written Opinion dated Aug. 29, 2024 for PCT/JP2022/006218.
Office Action issued in Japanese Patent Application No. P2024-500779 dated Aug. 5, 2025 (with English partial translation).

* cited by examiner

*Primary Examiner* — Dylan M Katz
(74) *Attorney, Agent, or Firm* — SHIPWAY IP

(57) ABSTRACT

A robot control system includes circuitry configured to acquire a plurality of disturbance torques and a plurality of axis positions for a plurality of axes of a robot. The plurality of disturbance torques corresponds to the plurality of axis positions, and the plurality of disturbance torques and the plurality of axis positions correspond to a particular motion of the robot. The circuitry is further configured to transmit input data to a learned model for external force. The input data includes the plurality of disturbance torques or the plurality of axis positions. The circuitry is further configured to receive output data from the learned model for external force, calculate an estimated external force having acted on an end effector of the robot based on the output data, and control the robot based on the estimated external force. The output data includes transmission torque data or external force data.

17 Claims, 11 Drawing Sheets

ESTIMATION OF EXTERNAL FORCE FOR ROBOT CONTROL

CROSS-REFERENCE TO RELATED APPLICATIONS

This application is a continuation application of PCT Application No. PCT/JP2022/006218, filed on Feb. 16, 2022. The entire contents of the above listed PCT and priority applications are incorporated herein by reference.

BACKGROUND

Field

The present disclosure relates to a robot control system, a robot control method, a robot control program, and an estimation system.

Description of the Related Art

Japanese Unexamined Patent Application Publication No. 2012-11403 discloses a robot system that obtains an estimated disturbance torque by a disturbance observer from a torque command to each axis motor of a robot and a velocity detection value of each axis, executes high-pass filter processing on the estimated disturbance torque, and then executes coordinate transformation to estimate an external force.

SUMMARY

A robot control system according to an aspect of the present disclosure includes circuitry configured to: acquire a plurality of disturbance torques and a plurality of axis positions for a plurality of axes of a robot, wherein the plurality of disturbance torques corresponds to the plurality of axis positions, and wherein the plurality of disturbance torques and the plurality of axis positions correspond to a particular motion of the robot; transmit input data to a learned model for external force, wherein the input data includes the plurality of disturbance torques or the plurality of axis positions; receive output data from the learned model for external force, wherein the output data includes transmission torque data or external force data; calculate an estimated external force having acted on an end effector of the robot based on the output data; and control the robot based on the estimated external force.

A method for controlling a robot according to an aspect of the present disclosure includes: acquiring a plurality of disturbance torques and a plurality of axis positions for a plurality of axes of a robot, wherein the plurality of disturbance torques corresponds to the plurality of axis positions, and wherein the plurality of disturbance torques and the plurality of axis positions correspond to a particular motion of the robot; transmitting input data to a learned model for external force, wherein the input data includes the plurality of disturbance torques or the plurality of axis positions; receiving output data from the learned model for external force, wherein the output data includes transmission torque data or external force data; calculating an estimated external force having acted on an end effector of the robot based on the output data; and controlling the robot based on the estimated external force.

A non-transitory computer-readable storage medium according to an aspect of the present disclosure stores processor-executable instructions to: acquire a plurality of disturbance torques and a plurality of axis positions for a plurality of axes of a robot, wherein the plurality of disturbance torques corresponds to the plurality of axis positions, and wherein the plurality of disturbance torques and the plurality of axis positions correspond to a particular motion of the robot; transmit input data to a learned model for external force, wherein the input data includes the plurality of disturbance torques or the plurality of axis positions; receive output data from the learned model for external force, wherein the output data includes transmission torque data or external force data; calculate an estimated external force having acted on an end effector of the robot based on the output data; and control the robot based on the estimated external force.

BRIEF DESCRIPTION OF THE DRAWINGS

FIG. 2 is a diagram showing an example hardware configuration of a computer used for a robot control system.

FIG. 5 is a diagram showing an example of a plurality of candidate positions indicated by a data table.

DETAILED DESCRIPTION

In the following description, with reference to the drawings, the same reference numbers are assigned to the same components or to similar components having the same function, and overlapping description is omitted.

Configuration of System

Overall Configuration

Figure 1:
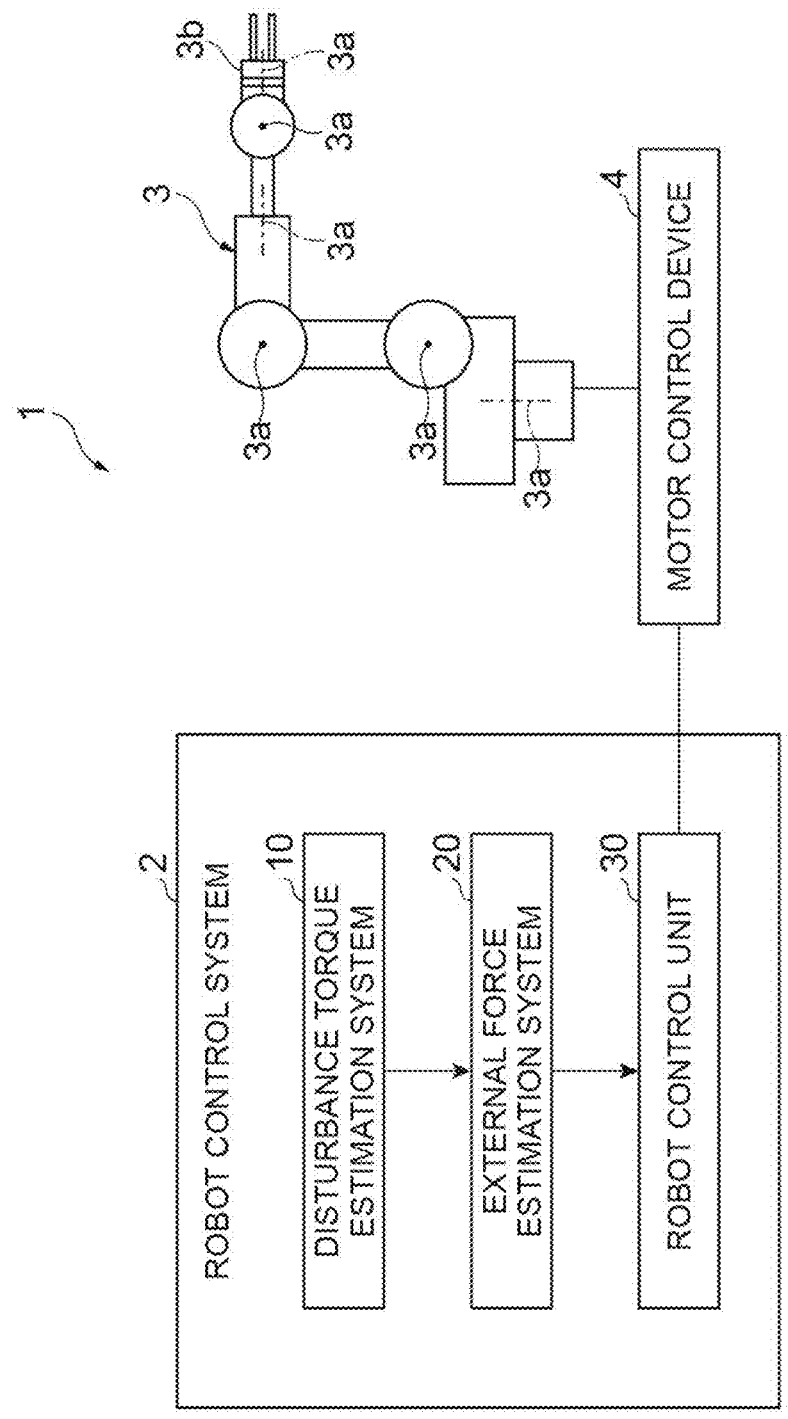
FIG. 1 is a diagram showing an example robot system.

FIG. 1 is a diagram showing an example robot system 1. The robot system 1 includes an example robot control system 2 and at least one robot 3. The robot system 1 is an example of application of the robot control system according to the present disclosure. The robot control system 2 is a computer system for operating the robot 3 located in a real working space. A motor control device 4 controlling a motor of the robot 3 may also be located in the working space. The robot control system 2 and the motor control device 4 are connected to each other via a communication network. The communication network connecting the devices may be a wired network or a wireless network. The communication network may be built by including at least one of the Internet and an intranet. Alternatively, the communication network may be simply implemented by one communication cable.

The robot 3 is a device that receives power and performs a predetermined operation according to a purpose to perform a useful work. In some examples, the robot 3 includes a plurality of joints and is configured to be capable of performing various processes in a state with an end effector 3b held in a tip portion. The joint is an example of a driven object which the robot control system 2 is to control. An axis (joint axis) 3a is set in each of the plurality of joints. Some components of the robot 3, such as an arm and a pivot, rotate about the axis 3a such that the robot 3 may freely change a position and posture of the tip portion within a predetermined range. In some examples, the robot 3 is a vertically articulated robot of multi-axis serial link type. The robot 3 may be a 6-axis vertically articulated robot or a 7-axis vertically articulated robot in which one redundant axis is added to 6 axes.

The end effector 3b is a device that acts on a workpiece, for example, a device that imparts some physical change to the workpiece. The end effector 3b may be various devices such as a polishing tool, a welding gun, a press machine, and the like.

The motor is a device that generates power for driving a driven object of the robot 3 in response to electric power supplied from the motor control device 4. The individual motors cause the individual driven objects to operate so that the end effector 3b performs a predetermined task on the workpiece. The motor may be a rotary motor that rotates the driven object or a linear motor that moves the driven object along a straight line. The motor may be a synchronous motor or an induction motor. The motor may be a synchronous motor of permanent magnet type such as a surface permanent magnet (SPM) motor or an interior permanent magnet (IPM) motor. The motor may be a synchronous motor without permanent magnets, such as a synchronous reluctance motor. The motor may be a DC motor or an AC motor.

The robot 3 may include at least one sensor which is a device that detects a response of the robot 3 operated by the electric power from the motor control device 4. The response refers to an output of the robot with respect to a command which is a command for controlling the robot. For example, the response indicates information on at least one of a motion and a state of the robot 3. The response may indicate information on at least one of an operation and a state of the motor, for example, may indicate at least one of an axis velocity and a magnetic pole position of the motor. In a case where the motor is a rotary type, the rotation angle of the driven object by the motor corresponds to the "position", and the rotation velocity of the driven object by the motor corresponds to the "velocity". The response may indicate information on at least one of an operation and a state of the driven object, for example, at least one of a position, a velocity, and a force of the driven object. The sensor transmits a response signal indicative of the response to the robot control system 2. The response may be a value itself obtained by the sensor or may be represented by a value calculated or processed by a given operation or algorithm. Examples of the sensor include a rotary encoder that outputs a pulse signal having a frequency proportional to a motion velocity of the motor. The rotary encoder is capable of obtaining both the position and velocity of the motor.

The motor control device 4 is a device for causing the output of the motor to follow the commands from the robot control system 2. The motor control device 4 generates electric power for operating the motor based on the command from the robot control system 2 and supplies the electric power to the motor. The supplied electric power corresponds to a driving force command such as a torque command and a current command. The motor control device 4 may be, for example, an inverter or a servo amplifier. The motor control device 4 may be incorporated into the robot 3.

The motor control device 4 may include a sensor that detects a response of the motor control device 4.

In some examples, the robot control system 2 operates the robot 3 with a hybrid control of position and force (this is also referred to simply as "hybrid control"). One example of operation by the robot 3 is to process a workpiece while the end effector 3b is in contact with the workpiece, such as assembly and polishing. In such an operation, not only the position of the end effector 3b but also the force applied to the workpiece by the end effector 3b needs to be appropriately controlled. The hybrid control is a method for realizing the appropriate control. The hybrid control is a technique for simultaneously controlling the position and force of the robot 3 by obtaining a position and force of each of a position control axis and a force control axis and feeding back the position and force to a position control loop and a force control loop to follow a target value. The position control axis is a coordinate axis defining a direction in which the position of the robot 3 is to be controlled, and the force control axis is a coordinate axis defining a direction in which the force of the robot 3 is to be controlled. In some examples, the force control axis is orthogonal to the position control axis. For example, by applying the hybrid control to polishing of a workpiece with the robot 3, it is possible to move a polishing tool, which is the end effector 3b, at a desired velocity along the workpiece surface while applying a desired force along the normal direction of the workpiece surface to the polishing tool.

In some examples, the robot control system 2 estimates an external force having affected on the end effector 3b and controls the robot 3 based on the external force. In the present disclosure, the external force estimated by the robot control system 2 is also referred to as "estimated external force". Since the robot control system 2 has this function, the robot 3 may be accurately controlled even in a case where the robot 3 does not have a force sensor for detecting force, that is, in a case of a force-sensorless robot 3. In a case where a sensor system including a force sensor is expensive or there is a concern that the sensor system is likely to fail due to environmental factors such as dust or water droplets, it is difficult to introduce force control using the force sensor. By applying the robot control system 2 to the force-sensorless robot 3, it is possible to accurately control the robot 3 while suppressing a cost for constructing the robot system 1. Also in a case where the robot 3 has a force sensor, the robot control system 2 may calculate the estimated external force and control the robot 3 based on the estimated external force.

The robot control system 2 acquires a plurality of disturbance torques corresponding to a plurality of the axes 3a of the robot 3, that is, the disturbance torque of each axis 3a, and calculates the estimated external force based on these disturbance torques. The disturbance torque refers to a difference between a torque command to the motor and an actual torque obtained as a response. It may be said that the disturbance torque is a torque caused by an unintended disturbance. For example, in a case where the robot 3 is a 6-axis vertically articulated robot, the robot control system 2 acquires the disturbance torque for each of the six axes and calculates the estimated external force based on the six disturbance torques. The robot control system 2 may estimate a plurality of disturbance torques corresponding to the plurality of axes 3a in order to calculate the estimated external force.

As shown in FIG. 1, in some examples, the robot control system 2 includes a disturbance torque estimation system 10, an external force estimation system 20, and a robot control unit 30 as functional components.

The disturbance torque estimation system 10 is a subsystem that calculates the plurality of disturbance torques corresponding to the plurality of axes 3a of the robot 3. The disturbance torque estimation system 10 uses a reference torque model to calculate the disturbance torques. The reference torque model is a calculation model reflecting a relationship between a trajectory of the end effector 3b and a plurality of reference torques corresponding to the plurality of axes 3a of the robot 3 moving along the trajectory without being affected by a disturbance. The reference torque refers to a torque that is output to control the axis 3a in a case where the robot 3 is moved along a given trajectory without being affected by a disturbance. The disturbance torque estimation system 10 calculates, based on the reference torque model and a plurality of actual torques corresponding to the plurality of axes 3a of the robot 3 moved along an actual trajectory, the plurality of disturbance torques in the actual trajectory. The actual trajectory refers to a trajectory indicating an actual motion of the robot 3. In some examples, the disturbance torque estimation system 10 identifies the plurality of reference torques based on the reference torque model and posture information indicating a posture of the robot 3 in the actual trajectory. The disturbance torque estimation system 10 then calculates a difference between the actual torque and the reference torque as the disturbance torque, for each of the plurality of axes 3a.

The external force estimation system 20 is a subsystem that executes estimation processing based on the plurality of disturbance torques and a plurality of axis positions corresponding to the plurality of axes 3a of the robot 3 to calculate an external force having affected on the end effector 3b of the robot 3 as the estimated external force. The axis position refers to a position related to one axis 3a and is represented by, for example, a rotation angle. In some examples, the plurality of disturbance torques corresponds to the plurality of axis positions, and the plurality of disturbance torques and the plurality of axis positions correspond to a particular motion of the robot 3. For example, in a case where the robot 3 is a 6-axis vertically articulated robot, the robot control system 2 acquires the axis position for each of the six axes, and executes the estimation processing based on six disturbance torques and six axis positions. As at least part of estimation processing, the external force estimation system 20 executes calculation by a learned model for external force that receives at least one of the plurality of disturbance torques and the plurality of axis positions as an input. Examples of the axis position include a feedback position obtained by the response and a commanded position used to generate a command to the motor control device 4. The feedback position represents an actual position of the axis 3a. The commanded position represents a goal of the position of the axis 3a. Hereinafter, the robot control system 2 will be described by taking the feedback position as an example of the axis position.

The robot control unit 30 is a functional module that controls the robot 3 based on the estimated external force calculated by the external force estimation system 20. The robot control unit 30 outputs a command based on the estimated external force to the motor control device 4. Based on the command, the motor control device 4 generates electric power for operating the motor and supplies the electric power to the motor.

The robot control system 2 may be realized by any type of computer. The computer may be a general-purpose computer such as a personal computer or a business server, or may be incorporated into a dedicated device that executes particular processing. The robot control system 2 may be realized by one computer or may be realized by a distributed system including a plurality of computers.

Figure 2:
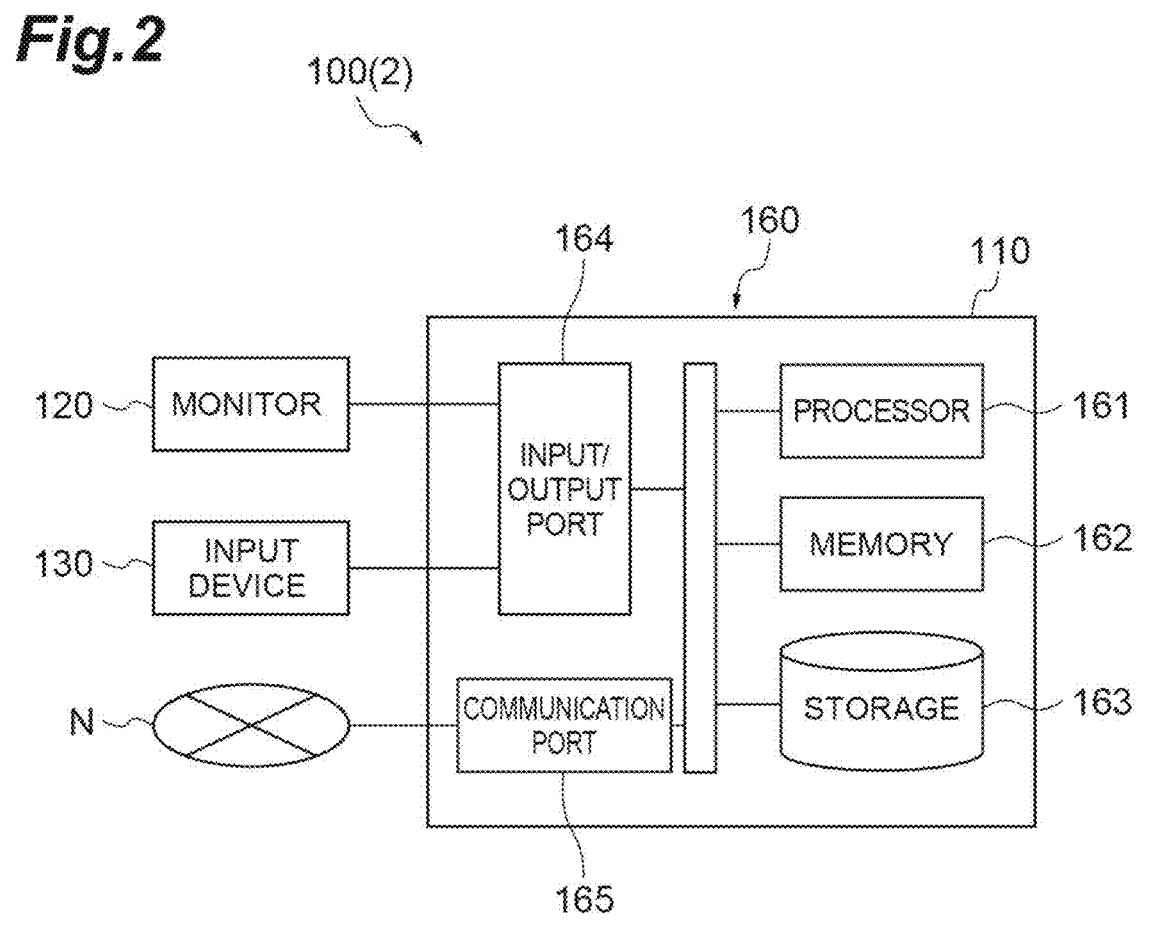

FIG. 2 is a diagram showing an example hardware configuration of a computer 100 used for the robot control system 2. In this example, the computer 100 includes a main body 110, a monitor 120, and an input device 130.

The main body 110 is a device including circuitry 160. The circuitry 160 includes at least one processor 161, a memory 162, a storage 163, an input/output port 164, and a communication port 165. The storage 163 records a program for configuring each functional module of the main body 110. The storage 163 is a computer-readable storage medium such as a hard disk, a nonvolatile semiconductor memory, a magnetic disk, or an optical disc. The memory 162 temporarily stores the program loaded from the storage 163, calculation results by the processor 161, and the like. The processor 161 configures each functional module by executing the program in cooperation with the memory 162. The input/output port 164 inputs and outputs electrical signals to and from the monitor 120 or the input device 130 in response to commands from the processor 161. The input/output port 164 may perform the input and output of the electrical signals with another device. The communication port 165 performs data communication with another device via a communication network N according to commands from the processor 161.

The monitor 120 is a device for displaying information output from the main body 110. The monitor 120 may be of any type as long as graphic display is possible, and specific examples thereof include a liquid crystal panel.

The input device 130 is a device for inputting information into the main body 110. The input device 130 may be of any type as long as it is capable of inputting desired information, and specific examples thereof include operation interfaces such as a keypad, a mouse, and a manipulation controller.

The monitor 120 and the input device 130 may be integrated as a touch panel. The main body 110, the monitor 120, and the input device 130 may be integrated, such as a tablet computer.

Each functional module of the robot control system 2 is realized by reading a robot control program on the processor 161 or the memory 162 and causing the processor 161 to execute the program. The robot control program includes code for realizing each functional module of the robot control system. The processor 161 operates the input/output port 164 or the communication port 165 in accordance with the robot control program to read and write data in the memory 162 or the storage 163.

The robot control program may be provided after being fixedly recorded in a non-transitory storage medium such as a CD-ROM, a DVD-ROM, or a semiconductor memory. Alternatively, the robot control program may be provided as a data signal superimposed on a carrier wave through a communication network.

Disturbance Torque Estimation System

Figure 3:
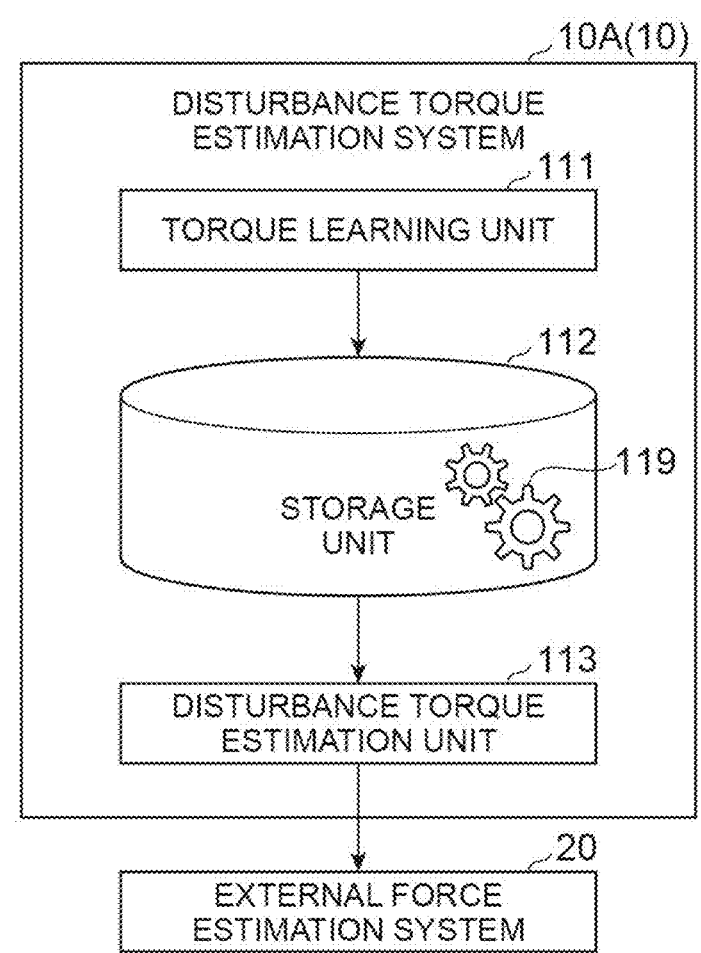
FIG. 3 is a diagram showing an example functional configuration of a disturbance torque estimation system.

FIG. 3 is a diagram showing an example functional configuration of the disturbance torque estimation system 10 as a disturbance torque estimation system 10A. The disturbance torque estimation system 10A includes a torque learning unit 111, a storage unit 112, and a disturbance torque estimation unit 113 as functional components.

The torque learning unit 111 is a functional module that generates a learned model for torque 119, which is an example of the reference torque model. The learned model for torque 119 is a calculation model that receives a plurality of feedback positions corresponding to the plurality of axes 3a of the robot 3 in the actual trajectory as an input and calculates a plurality of reference torques corresponding to the plurality of axes 3a. The torque learning unit 111 executes machine learning based on training data indicating at least combinations of a plurality of past feedback positions and a plurality of past reference torques used as a ground truth value, to generate the learned model for torque 119. The machine learning refers to a method of autonomously finding a law or rule by repeatedly learning based on given information. The training data prepared in advance is generated, for example, based on past response data collected while operating the robot 3 with various postures in a situation where the robot 3 is not affected by a disturbance. The learned model for torque 119 is constructed using an algorithm and a data structure. In some examples, the learned model for torque 119 is generated in a manner that includes a neural network such as a convolutional neural network (CNN). The generation of the learned model for torque 119 by the torque learning unit 111 corresponds to the learning phase.

The storage unit 112 is a functional module that stores the learned model for torque 119 generated by the torque learning unit 111.

The disturbance torque estimation unit 113 is a functional module that calculates, based on the learned model for torque 119 and a plurality of actual torques corresponding to the plurality of axes 3a of the robot 3 that has operated along an actual trajectory, a plurality of disturbance torques in the actual trajectory. The disturbance torque estimation unit 113 outputs the plurality of disturbance torques to the external force estimation system 20.

Figure 4:
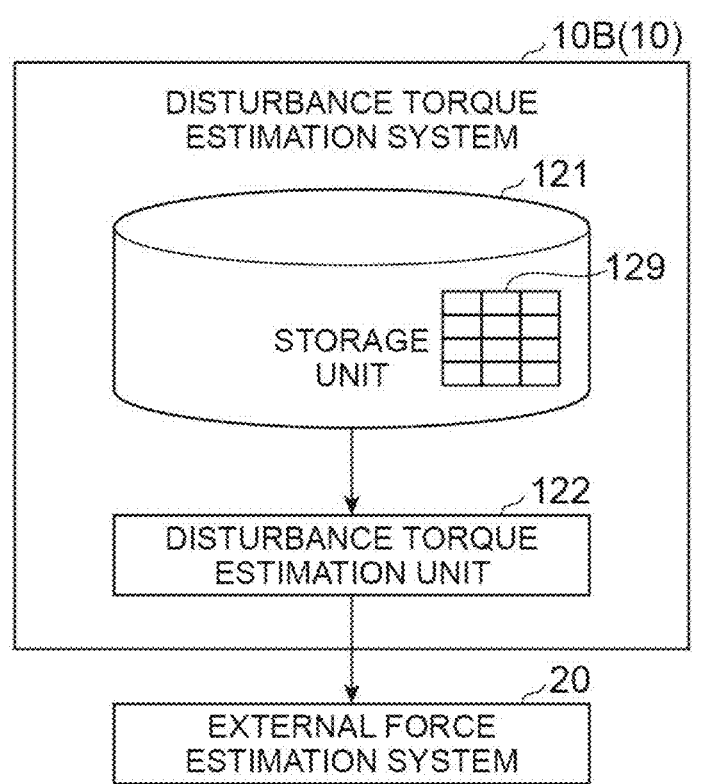
FIG. 4 is a diagram showing an example functional configuration of a disturbance torque estimation system.

FIG. 4 is a diagram showing an example functional configuration of the disturbance torque estimation system 10 as a disturbance torque estimation system 10B. The disturbance torque estimation system 10B includes a storage unit 121 and a disturbance torque estimation unit 122 as functional components.

The storage unit 121 is a functional module that stores a data table 129, which is an example of the reference torque model. The data table 129 is a calculation model indicating a relationship between each of a plurality of candidate positions of the end effector 3b and a plurality of reference torques corresponding to the plurality of axes 3a. By referring to the data table 129, the reference torque of each axis 3a may be identified in each candidate position. For example, the data table 129 is implemented as a correspondence table between the candidate position and the reference torque of each axis 3a. In some examples, the data table 129 is pre-stored in the storage unit 121 by a manager of the robot control system 2.

Figure 5:
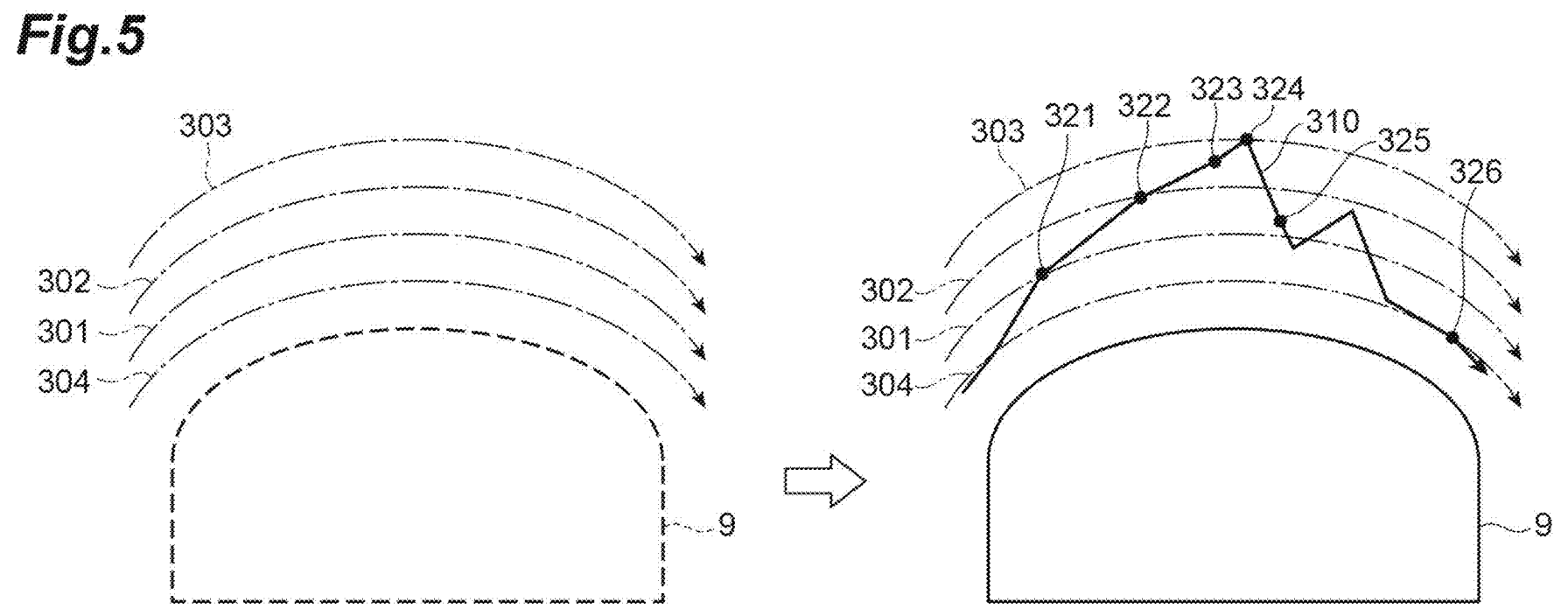

FIG. 5 is a diagram showing an example of the plurality of candidate positions indicated by the data table 129. This example shows four possible candidate trajectories 301 to 304 of the end effector 3b that moves along a surface of a workpiece 9. It may be said that each of the candidate trajectories 301 to 304 is a set of candidate positions. The candidate trajectories 301 to 304 are arranged to extend parallel to each other, for example extending parallel to each other along the surface of the workpiece 9. In some examples, one of the candidate trajectories 301 to 304 may be a reference trajectory that is set as a goal of a motion of the end effector 3b. For example, the candidate trajectory 301 may be set as the reference trajectory and the candidate trajectories 302 to 304 may be set as other candidate trajectories. In some examples, the candidate trajectories 301 to 304 are set at positions different from each other in a force control axis direction of the robot 3.

The actual trajectory of the end effector 3b may deviate from the reference trajectory due to various factors such as the command from the robot control unit 30 and a degree of contact between the end effector 3b and the workpiece 9. An actual trajectory 310 in FIG. 5 shows such a situation. By setting another candidate trajectory along the reference trajectory at a different position in the force control axis direction of the robot 3, it is possible to identify the reference torque at a certain time point even in a case where the actual position of the end effector 3b obtained from the response deviates from the reference trajectory at that time point. Each of the plurality of candidate positions that may be selected to identify the reference torque at a certain time point is included in one of the candidate trajectories 301 to 304 that are set to positions different from each other in the force control axis direction of the robot. In some examples, at least one candidate position is selected from the plurality of candidate positions arranged along the force control axis.

Returning to FIG. 4, the disturbance torque estimation unit 122 is a functional module that calculates, based on the data table 129 and a plurality of actual torques corresponding to the plurality of axes 3a of the robot 3 that has operated along an actual trajectory, the plurality of disturbance torques in the actual trajectory. The disturbance torque estimation unit 122 outputs the plurality of disturbance torques to the external force estimation system 20.

External Force Estimation System

Figure 6:
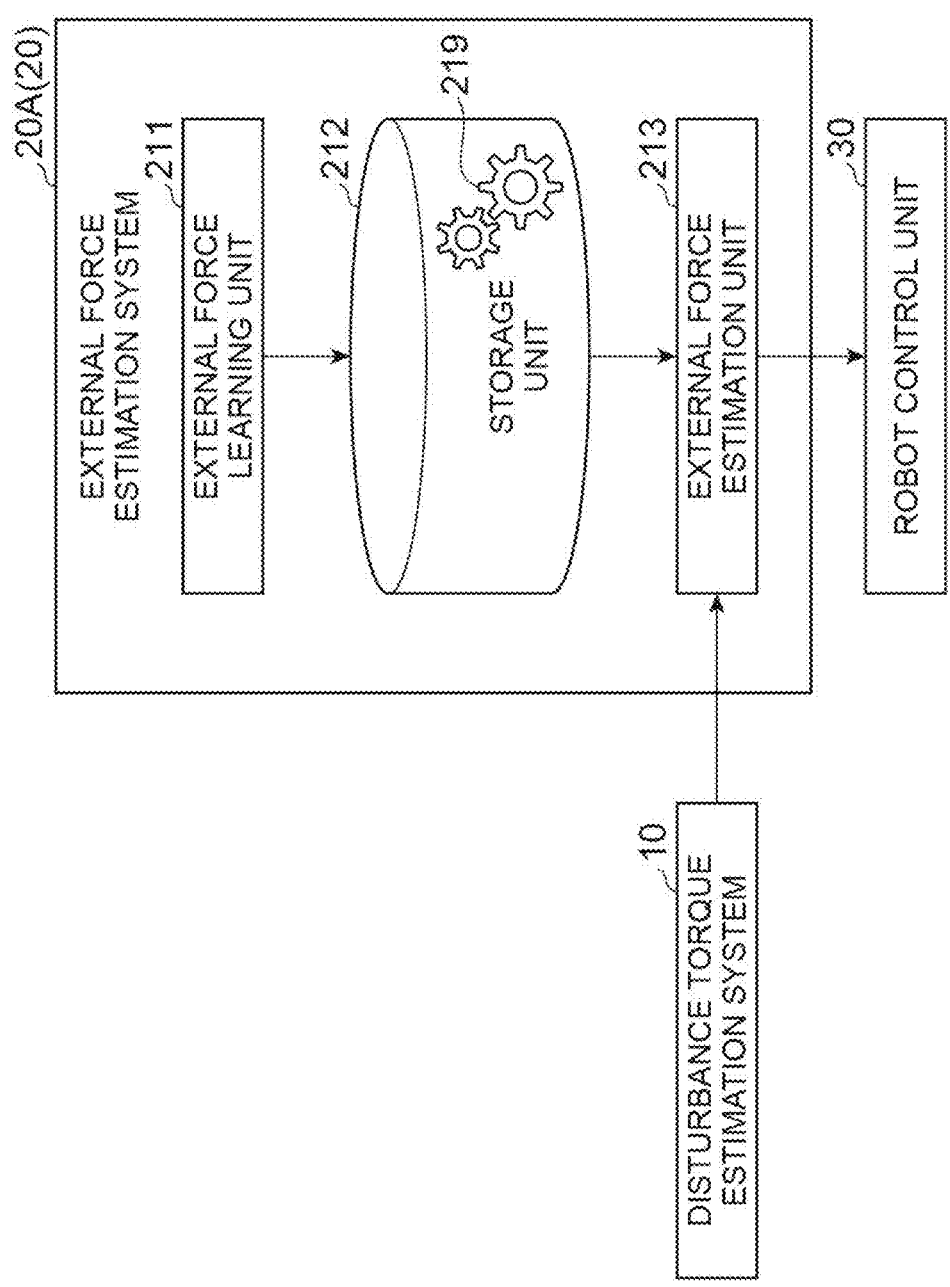
FIG. 6 is a diagram showing an example functional configuration of an external force estimation system.

FIG. 6 is a diagram showing an example functional configuration of the external force estimation system 20 as an external force estimation system 20A. The external force estimation system 20A includes an external force learning unit 211, a storage unit 212, and an external force estimation unit 213 as functional components.

The external force learning unit 211 is a functional module that generates a learned model for external force 219 for calculating the estimated external force. The learned model for external force 219 is a calculation model that receives a plurality of disturbance torques and a plurality of feedback positions corresponding to the plurality of axes 3a as an input and calculates the estimated external force. The learned model for external force 219 calculates the estimated external force as a result of reflecting transmission efficiency of each of the plurality of disturbance torques. That is, the estimated external force reflects the transmission efficiency of each of the plurality of disturbance torques. The learned model for external force 219 transmits the estimated external force as output data.

The estimated external force is calculated based on a transmission torque, which is a torque transmitted from the axis 3a to the end effector 3b. The transmission of torque is related to the transmission efficiency indicating a ratio of the torque transmitted to the end effector 3b and a reduction ratio indicating a ratio at which the rotation velocity of the motor is reduced. The reduction ratio may be considered as a fixed value. On the other hand, since the transmission efficiency dynamically changes due to factors such as fluctuation of a load applied to each axis 3a and deterioration of a speed reducer, it is difficult to accurately calculate the transmission efficiency. Therefore, it is not easy to calculate the estimated external force. In order to accurately calculate the estimated external force, the external force learning unit 211 executes machine learning to generate the learned model for external force 219. Since the learned model for external force 219 that accurately reflects not only the reduction ratio but also the transmission efficiency is obtained by the machine learning, accurate calculation of the estimated external force may be expected.

The external force learning unit 211 executes the machine learning based on training data indicating combinations of a pair of a past disturbance torque and a past feedback position of each axis 3*a*, and a past actual external force actually affected on the end effector 3*b*, to generate the learned model for external force 219. The actual external force is used as a ground truth value of the machine learning. The training data prepared in advance is generated, for example, based on response data collected while operating the robot 3 with various postures in a situation where a disturbance may occur. During the data collection, a force sensor is mounted on the robot 3 to obtain the actual external force. The learned model for external force 219 is constructed using an algorithm and a data structure. In some examples, the learned model for external force 219 is generated in a manner that includes a neural network such as a convolutional neural network (CNN). The generation of the learned model for external force 219 by the external force learning unit 211 corresponds to the learning phase.

The storage unit 212 is a functional module that stores the learned model for external force 219 generated by the external force learning unit 211.

The external force estimation unit 213 is a functional module that executes estimation processing based on the plurality of disturbance torques and the plurality of feedback positions corresponding to the plurality of axes 3*a* to calculate an estimated external force. The external force estimation unit 213 executes, as the estimation processing, calculation by the learned model for external force 219. In a case where the learned model for external force 219 includes a neural network, the external force estimation unit 213 executes, as at least part of the estimation processing, calculation with the neural network. The external force estimation unit 213 outputs the estimated external force to the robot control unit 30.

Figure 7:
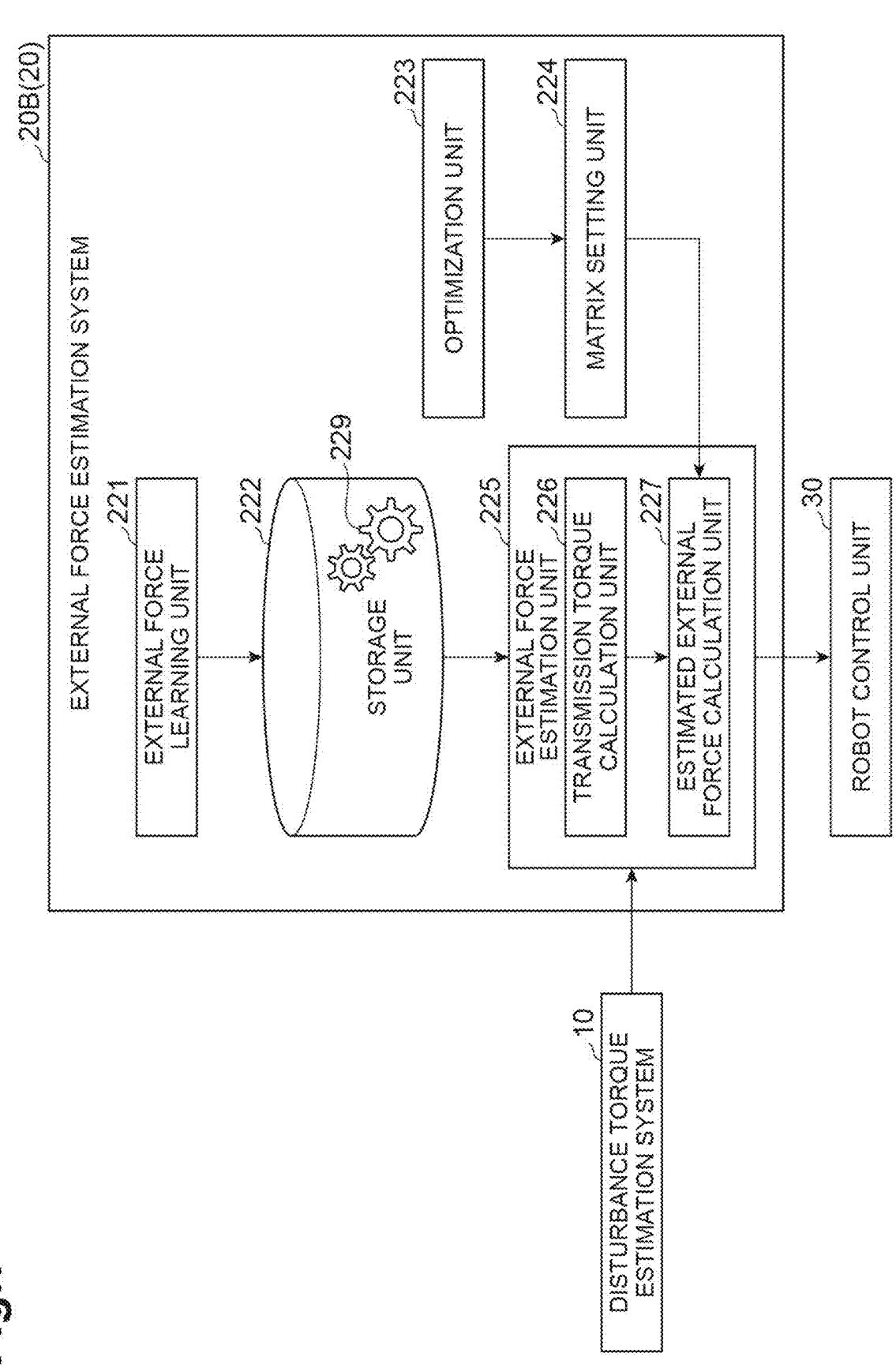
FIG. 7 is a diagram showing an example functional configuration of an external force estimation system.

FIG. 7 is a diagram showing an example functional configuration of the external force estimation system 20 as an external force estimation system 20B. The external force estimation system 20B includes an external force learning unit 221, a storage unit 222, an optimization unit 223, a matrix setting unit 224, and an external force estimation unit 225 as functional components.

The external force learning unit 221 is a functional module that generates a learned model for external force 229 for calculating the transmission torque. The learned model for external force 229 is a calculation model that calculates the transmission torque for each of the plurality of axes 3*a* based on the plurality of disturbance torques corresponding to the plurality of axes 3*a*. The learned model for external force 229 calculates the plurality of transmission torques as a result of reflecting the transmission efficiency of each of the plurality of disturbance torques. That is, the plurality of transmission torques reflects the transmission efficiency of each of the plurality of disturbance torques. In some examples, the learned model for external force 229 receives the plurality of disturbance torques as input data. The learned model for external force 229 then calculates, for the plurality of axes, a plurality of transmission torques that are transmitted to the end effector 3*b*, and generates the transmission torque data indicating the plurality of transmission torques. The learned model for external force 229 transmits the transmission torque data as output data.

The external force learning unit 221 executes machine learning to generate the learned model for external force 229. Since the learned model for external force 229 that accurately reflects not only the reduction ratio but also the transmission efficiency is obtained by the machine learning, accurate calculation of the transmission efficiency may be expected.

The external force learning unit 221 executes the machine learning based on training data indicating combinations of a pair of a past disturbance torque and a past feedback position of each axis 3*a*, and a past actual external force of the end effector 3*b*, to generate the learned model for external force 229. In some examples, the external force learning unit 221 calculates a ground truth value of a past transmission torque of each axis 3*a* based on the past feedback position of each axis 3*a* and the past actual external force, for each of the combinations. This calculation is expressed by $\tau = J(\theta)F$. $\tau$ denotes a vector of the transmission torque, J denotes a Jacobian matrix defined based on a vector $\theta$ of the feedback position, and F denotes the actual external force. The external force learning unit 221 executes the machine learning based on the plurality of past disturbance torques indicated by the training data and the ground truth values of the plurality of transmission torques to generate the learned model for external force 229. The training data is prepared based on a past motion of the robot 3. The training data prepared in advance is generated, for example, based on past response data collected while operating the robot 3 equipped with a force sensor with various postures in a situation where an external force may occur. Similar to the learned model for external force 219, the learned model for external force 229 is constructed using an algorithm and a data structure and, for example, is generated in a manner that includes a neural network such as a convolutional neural network (CNNs). The generation of the learned model for external force 229 by the external force learning unit 221 corresponds to a learning phase.

The storage unit 222 is a functional module that stores the learned model for external force 229 generated by the external force learning unit 221.

The optimization unit 223 is a functional module that optimizes a structural parameter indicating a structure of the robot 3. The optimization unit 223 outputs the optimized structural parameter to the matrix setting unit 224. The structural parameter indicates a difference amount from a design value with respect to the structure of the robot 3. The structural parameter may indicate a sum of the design value and the difference amount. The difference amount may be at least one of a difference amount from a design value of a link length of the robot 3, a deflection amount of a link, a difference amount of each axis 3*a* from the origin of a given coordinate axis, and an error of an encoder. The optimization unit 223 optimizes the structural parameter based on a difference between the estimated external force and the actual external force of the end effector 3*b*. In some examples, the optimization unit 223 executes an optimization to minimize an error between the estimated external force and the actual external force of the end effector 3*b* to optimize the structural parameter. In some examples, the optimization is realized by a technique using a black box function, and for example, Bayesian optimization may be used. The minimized error may be represented by a mean square of a plurality of the errors.

The optimization of structural parameter is executed in advance before an actual operation by the robot control system 2. The data used for the optimization is collected, for example, during a test run of the robot control system 2. In the test run, a force sensor is mounted on the robot 3 in order to obtain the actual external force.

In the present disclosure, the "optimized structural parameter" refers to a structural parameter obtained based on the calculation by the optimization unit 223. The "optimized structural parameter" refers to a structural parameter that may be accepted as an optimal structural parameter, for example, a structural parameter that is estimated to be optimal. It should be noted that the "optimized structural parameter" may not an optimal structural parameter in reality.

The matrix setting unit 224 is a functional module that sets a Jacobian matrix J for calculating the estimated external force based on the plurality of feedback positions corresponding to the plurality of axes 3a and the structural parameter. In some examples, the matrix setting unit 224 sets the Jacobian matrix J based on the plurality of feedback positions and the optimized structural parameter. The matrix setting unit 224 outputs the Jacobian matrix J to the external force estimation unit 225.

The external force estimation unit 225 is a functional module that executes estimation processing based on the plurality of disturbance torques and the plurality of feedback positions corresponding to the plurality of axes 3a to calculate the estimated external force. The external force estimation unit 225 outputs the estimated external force to the robot control unit 30. The external force estimation unit 225 executes, as at least part of the estimation processing, calculation by the learned model for external force 229. In a case where the learned model for external force 229 includes a neural network, the external force estimation unit 225 executes, as at least part of the estimation processing, calculation by the neural network. In some examples, the external force estimation unit 225 includes a transmission torque calculation unit 226 and an estimated external force calculation unit 227.

The transmission torque calculation unit 226 is a functional module that inputs the plurality of disturbance torques corresponding to the plurality of axes 3a to the learned model for external force 229 to calculate the plurality of transmission torques corresponding to the plurality of axes 3a. The transmission torque calculation unit 226 outputs the plurality of transmission torques to the estimated external force calculation unit 227.

The estimated external force calculation unit 227 is a functional module that calculates the estimated external force based on the plurality of transmission torques. In some examples, the estimated external force calculation unit 227 calculates the estimated external force based on the plurality of transmission torques and the Jacobian matrix J.

Robot Control Method

Figure 8:
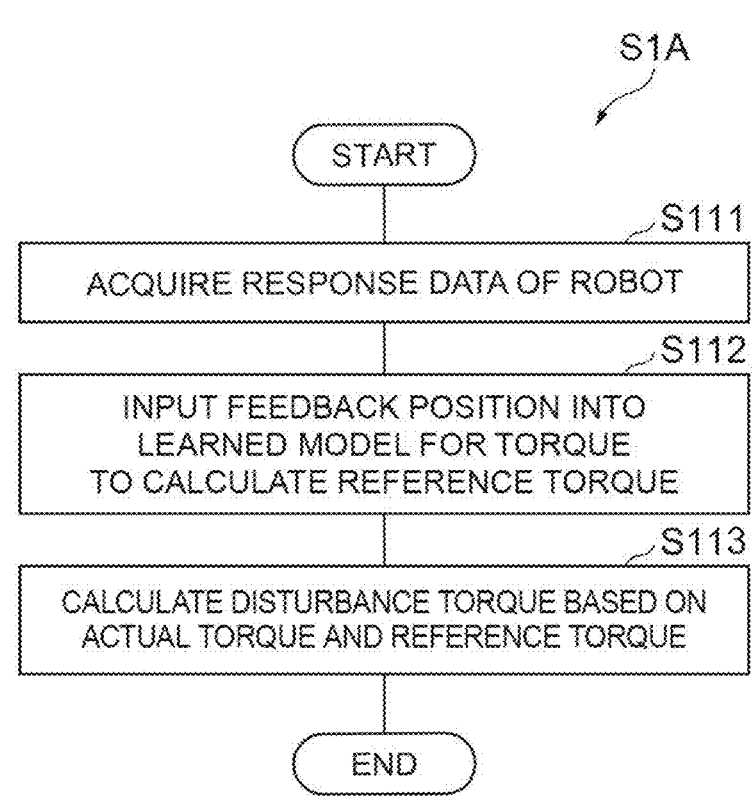
FIG. 8 is a flowchart showing an example of estimation of disturbance torque.
Figure 9:
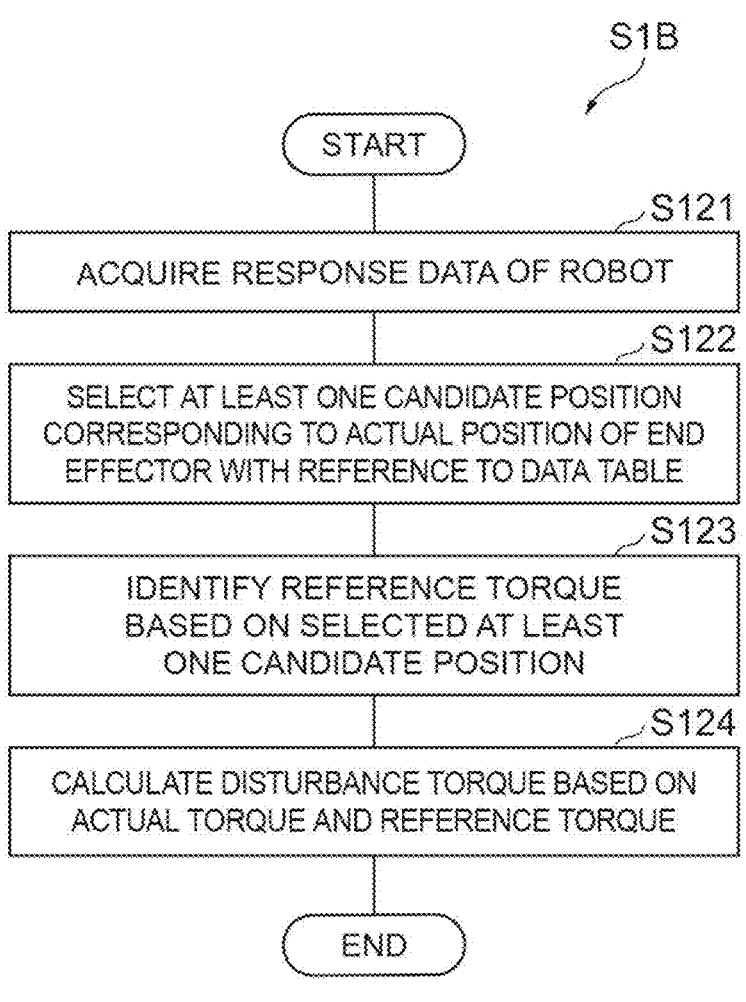
FIG. 9 is a flowchart showing an example of estimation of disturbance torque.
Figure 10:
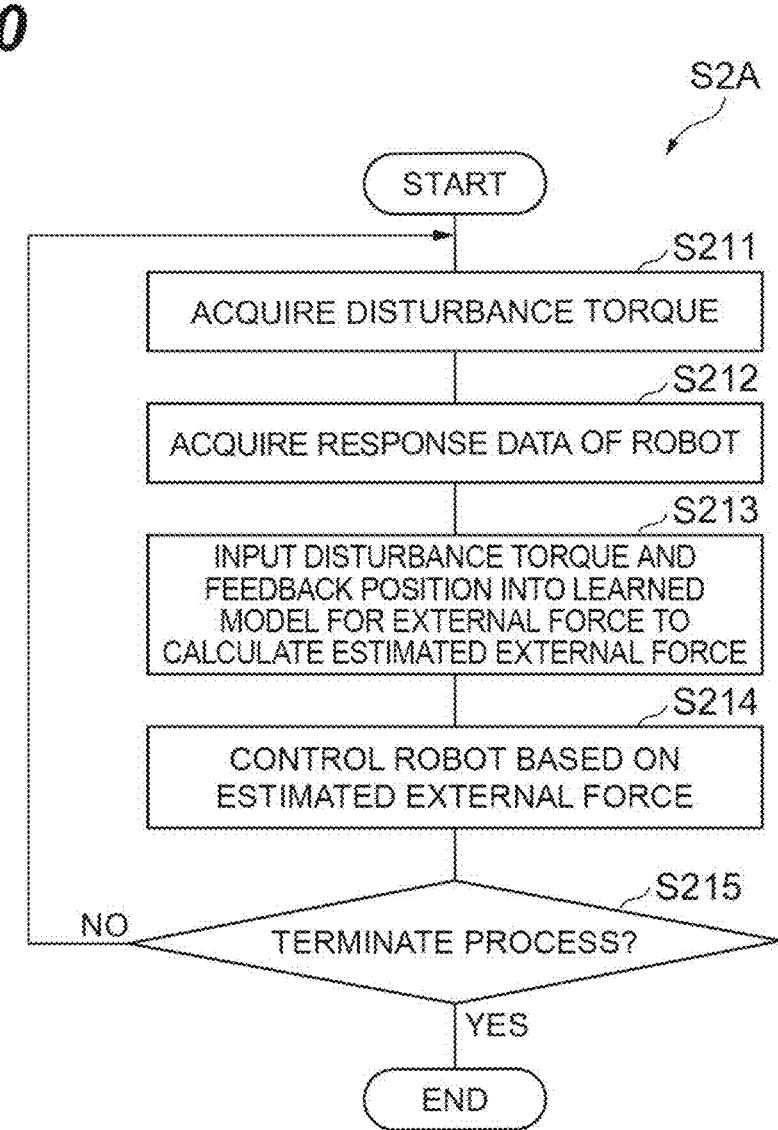
FIG. 10 is a flowchart showing an example of estimation of external force.
Figure 11:
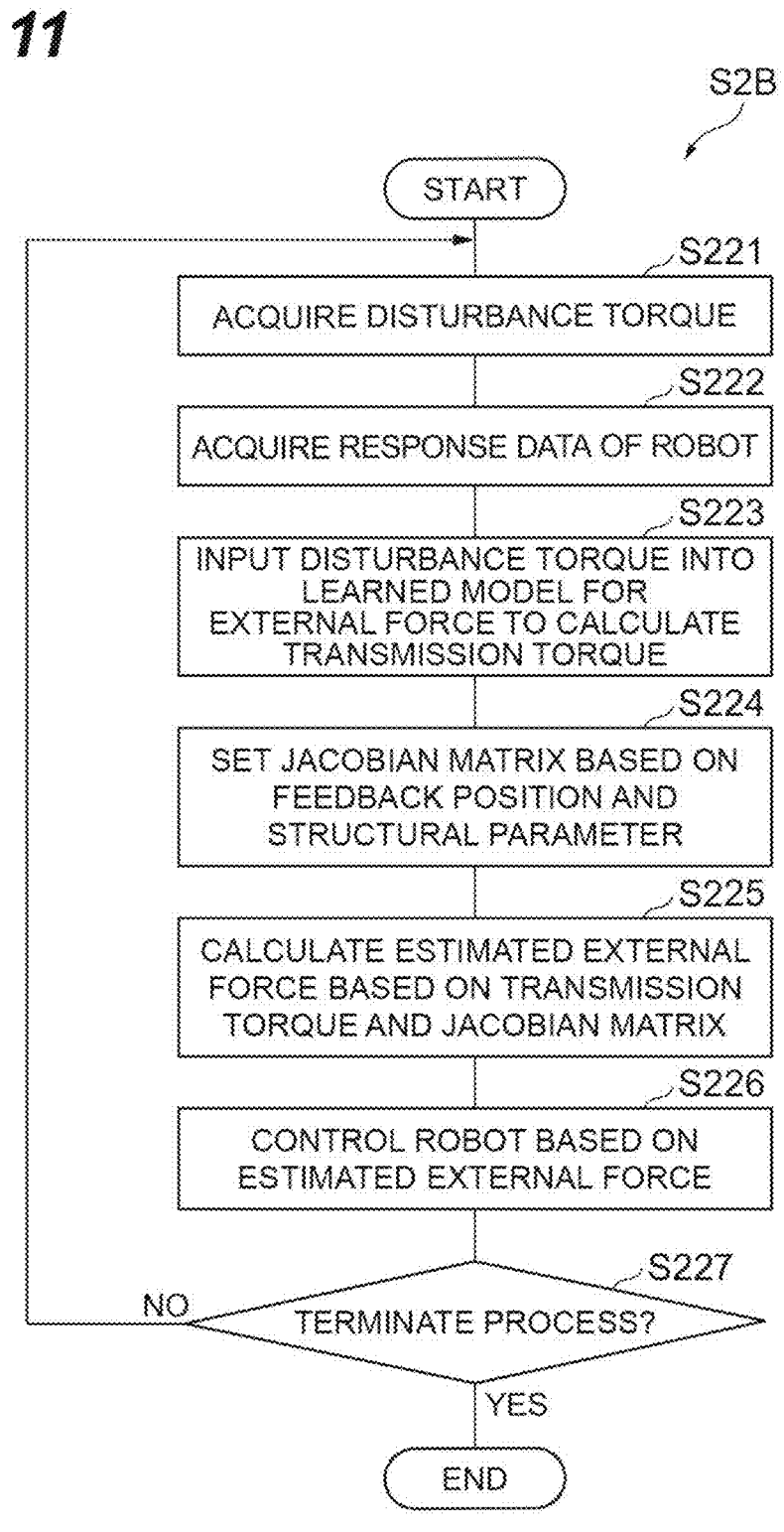
FIG. 11 is a flowchart showing an example of estimation of external force.

As an example method for controlling a robot according to the present disclosure, various examples of processing procedures executed by the robot control system 2 will be described with reference to FIGS. 8 to 11. FIGS. 8 and 9 show examples of processing in the disturbance torque estimation system 10, and FIGS. 10 and 11 show examples of processing in the external force estimation system 20 and the robot control unit 30. FIG. 8 is a flowchart showing example processing in the disturbance torque estimation system 10A as a processing flow S1A. FIG. 9 is a flowchart showing example processing in the disturbance torque estimation system 10B as a processing flow S1B. FIG. 10 is a flowchart showing example processing in the external force estimation system 20A and the robot control unit 30 as a processing flow S2A. FIG. 11 is a flowchart showing example processing in the external force estimation system 20B and the robot control unit 30 as a processing flow S2B. That is, the robot control system 2 executes the processing flow S1A or S1B with respect to the estimation of the disturbance torque and executes the processing flow S2A or S2B with respect to the estimation of the external force.

Estimation of Disturbance Torque

An example of processing in the disturbance torque estimation system 10A will be described with reference to FIG. 8. The processing flow S1A is performed after the learned model for torque 119 is stored in the storage unit 112. The processing flow S1A therefore corresponds to an operation phase.

In step S111, the disturbance torque estimation unit 113 acquires response data of the robot 3. The response data is electronic data indicating a response of the robot 3 or the motor control device 4. The response data indicates, for example, a feedback position and actual torque of each axis 3a.

In step S112, the disturbance torque estimation unit 113 inputs the feedback position into the learned model for torque 119 to calculate the reference torque. The feedback position is an example of posture information indicating a posture of the robot 3 in an actual trajectory. The disturbance torque estimation unit 113 reads the learned model for torque 119 from the storage unit 112. The disturbance torque estimation unit 113 inputs the feedback position of each axis 3a into the learned model for torque 119 to calculate the reference torque of each axis 3a.

In step S113, the disturbance torque estimation unit 113 calculates a disturbance torque based on the actual torque and the reference torque. The disturbance torque estimation unit 113 calculates a difference between the actual torque and the reference torque as the disturbance torque, for each of the plurality of axes 3a. The disturbance torque estimation unit 113 outputs the disturbance torque of each axis 3a to the external force estimation system 20.

An example of processing in the disturbance torque estimation system 10B will be described with reference to FIG. 9.

In step S121, the disturbance torque estimation unit 122 acquires response data of the robot 3. The response data indicates, for example, a feedback position of each axis 3a and an actual position of the end effector 3b. Like the feedback position, the actual position of the end effector 3b is an example of posture information. The actual position of the end effector 3b may be acquired directly by a given sensor or indirectly by calculation based on the plurality of feedback positions corresponding to the plurality of axes 3a.

In step S122, the disturbance torque estimation unit 122 selects at least one candidate position corresponding to the actual position of the end effector 3b from a plurality of candidate positions with reference to the data table 129. In some examples, the disturbance torque estimation unit 122 selects at least one candidate position from the plurality of candidate positions set along the force control axis direction of the robot 3. The disturbance torque estimation unit 122 may select a candidate position that matches the actual position of the end effector 3b, or may select a candidate position closest to the actual position. Alternatively, the disturbance torque estimation unit 122 may select two candidate positions that exist so as to sandwich the actual position.

In step S123, the disturbance torque estimation unit 122 identifies a reference torque for each axis 3a based on the selected at least one candidate position. For example, the disturbance torque estimation unit 122 may identify the reference torque of each axis 3a corresponding to the selected at least one candidate position, with reference to the data table 129. In a case where a single candidate position is selected, the disturbance torque estimation unit 122 refers to the data table 129 to identify the reference torque of each axis 3a corresponding to that candidate position. In a case where two candidate positions including a first candidate position and a second candidate position are selected, the disturbance torque estimation unit 122 refers to the data table 129 to identify a first candidate torque corresponding to the first reference position and a second candidate torque corresponding to the second reference position, for each of the plurality of axes 3a. The disturbance torque estimation unit 122 then executes interpolation using the first reference torque and the second reference torque to calculate the reference torque at the actual position, for each of the plurality of axes 3a. This calculation is an example of identifying the reference torque.

An example of the processing of step S122, 123 will be described with reference to FIG. 5. In the example of FIG. 5, for each of four candidate trajectories 301 to 304 of the end effector 3b, the data table 129 defines a set of candidate positions constituting the candidate trajectory, and defines a reference torque of each axis 3a at each candidate position.

In the example of FIG. 5, it is assumed that the actual position of the end effector 3b moved along the actual trajectory 310 is an actual position 321 at the time point T1, an actual position 322 at the time point T2, an actual position 323 at the time point T3, an actual position 324 at the time point T4, an actual position 325 at the time point T5, and an actual position 326 at the time point T6.

In the processing for the time point T1, the disturbance torque estimation unit 122 selects a candidate position on the candidate trajectory 301 and identifies a reference torque of each axis 3a corresponding to that candidate position.

In the processing for the time point T2, the disturbance torque estimation unit 122 selects a candidate position on the candidate trajectory 302 and identifies a reference torque of each axis 3a corresponding to that candidate position.

In the processing for the time point T3, the disturbance torque estimation unit 122 may select a candidate position on the candidate trajectory 302 and a candidate position on the candidate trajectory 303 as two candidate positions existing so as to sandwich the actual position 323. In this case, the disturbance torque estimation unit 122 identifies a reference torque of each axis 3a at each of the two candidate positions, and calculates a reference torque of each axis 3a at the actual position 323 by interpolation. Alternatively, the disturbance torque estimation unit 122 may select a candidate position closer to the actual position 323 from the two candidate positions, and identify a reference torque of each axis 3a corresponding to the selected candidate position.

In the processing for the time point T4, the disturbance torque estimation unit 122 selects a candidate position on the candidate trajectory 303 and identifies a reference torque of each axis 3a corresponding to that candidate position.

In processing for the time point T5, the disturbance torque estimation unit 122 may select a candidate position on the candidate trajectory 301 that is closest to the actual position 325, and identify a reference torque for each axis 3a corresponding to that candidate position. Alternatively, the disturbance torque estimation unit 122 may select a candidate position on the candidate trajectory 301 and a candidate position on the candidate trajectory 302 as two candidate positions existing so as to sandwich the actual position 325. In this case, the disturbance torque estimation unit 122 identifies a reference torque of each axis 3a at each of the two candidate positions, and calculates a reference torque of each axis 3a at the actual position 323 by interpolation.

In the processing for the time point T6, the disturbance torque estimation unit 122 selects a candidate position on the candidate trajectory 304 and identifies a reference torque of each axis 3a corresponding to that candidate position.

Referring back to FIG. 9, in step S124, the disturbance torque estimation unit 122 calculates a disturbance torque based on the actual torque and the reference torque. The disturbance torque estimation unit 122 calculates a difference between the actual torque and the reference torque as the disturbance torque, for each of the plurality of axes 3a. The disturbance torque estimation unit 122 outputs the disturbance torque of each axis 3a to the external force estimation system 20.

Estimation of External Force

An example of processing in the external force estimation system 20A will be described with reference to FIG. 10. The processing flow S2A is executed after the learned model for external force 219 is stored in the storage unit 212. The processing flow S2A therefore corresponds to an operation phase.

In step S211, the external force estimation unit 213 acquires a disturbance torque. For example, the external force estimation unit 213 acquires the disturbance torque of each axis 3a estimated or calculated by the disturbance torque estimation system 10.

In step S212, the external force estimation unit 213 acquires response data of the robot 3. For example, the response data indicates a feedback position of each axis 3a. The external force estimation unit 213 may utilize the response data acquired by the disturbance torque estimation system 10.

In step S213, the external force estimation unit 213 inputs or transmits the disturbance torques and the feedback positions to the learned model for external force 219 to calculate an estimated external force. The disturbance torques and the feedback positions are examples of input data transmitted to the learned model for external force 219. The external force estimation unit 213 reads the learned model for external force 219 from the storage unit 212 and inputs or transmits the disturbance torque and feedback position of each axis 3a to the learned model for external force 219 to calculate the estimated external force. The external force estimation unit 213 receives or acquires, from the learned model for external force 219, external force data indicating the estimated external force. The external force data is an example of output data. In some examples, the external force estimation unit 213 calculates or identifies the estimated external force based on the external force data. The external force estimation unit 213 outputs the estimated external force to the robot control unit 30.

In step S214, the robot control unit 30 controls the robot 3 based on the estimated external force. For example, the robot control unit 30 executes feedback control on each of a position command value indicating a position to be realized by the robot 3 and a force command value indicating a force to be realized by the robot 3 to calculate an acceleration reference value that is a reference value of the acceleration command. In some examples, the estimated external force is used in this feedback control. The robot control unit 30 calculates a force reference value, which is a reference value of the force command, from the acceleration reference value. In this calculation, the robot control unit 30 may calculate the force reference value based further on a disturbance calculated by a disturbance observer. The robot control unit 30 converts the force reference value into a torque reference value through calculation of inverse kinematics, and generates a command based on the torque reference value. The robot control unit 30 outputs the command to the motor control device 4 to control the robot 3.

As indicated by step S215, the robot control system 2 may repeat the steps S211 to S214 until a predetermined process ends. For example, the robot control system 2 repeats the steps S211 to S214 at predetermined intervals. With respect to the repeated step S211, the disturbance torque estimation system 10 again executes the processing flow S1A or SIB to calculate the disturbance torque of each axis 3*a*.

An example of processing in the external force estimation system 20B will be described with reference to FIG. 11. The processing flow S2B is executed after the learned model for external force 229 is stored in the storage unit 222 and the structural parameter is optimized. The processing flow S2B therefore corresponds to an operation phase.

In step S221, the external force estimation unit 225 acquires a disturbance torque. The step S221 is the same as the step S211.

In step S222, the external force estimation unit 225 acquires response data of the robot 3. The step S222 is the same as the step S212.

In step S223, the transmission torque calculation unit 226 inputs the disturbance torque into the learned model for external force 229 to calculate a transmission torque. The transmission torque calculation unit 226 reads the learned model for external force 229 from the storage unit 222 and inputs the disturbance torque of each axis 3*a* into the learned model for external force 229 to calculate the transmission torque of each axis 3*a*. That is, the transmission torque calculation unit 226 transmits the plurality of disturbance torques as input data to the learned model for external force 229, and receives the transmission torque data indicating the plurality of transmission torques from the learned model for external force 229. The transmission torque data is an example of output data.

In step S224, the matrix setting unit 224 sets a Jacobian matrix J based on the feedback positions and the structural parameter. It is assumed that force in a coordinate system Σ of the working space is denoted by F, force in a coordinate system Σ' of the joint space is denoted by F', a position on the coordinate system Σ viewed from the coordinate system Σ' is denoted by P=(px, py, pz), a rotation matrix is denoted by R, and F'=JF is defined. In this case, the Jacobian matrix J is expressed by Equation (1).

[Equation 1]

$$ J = \begin{bmatrix} R & 0 \\ P\times & R \end{bmatrix}, \text{ where } P\times = \begin{bmatrix} 0 & -pz & py \\ pz & 0 & -px \\ -py & px & 0 \end{bmatrix} \quad (1) $$

The position P is a sum of the link length of the robot 3 and the difference amount of the link length from the design value. The rotation matrix R is calculated from the feedback position of each axis 3*a* and the difference amount of each axis 3*a* from the origin. Both the position P and the difference amount of each axis 3*a* are examples of structural parameters, and are also examples of difference amounts from design values related to the structure of the robot 3.

In step S225, the estimated external force calculation unit 227 calculates an estimated external force based on the transmission torque and the Jacobian matrix J. The estimated external force calculation unit 227 calculates the estimated external force based on the transmission torque of each axis 3*a* and the Jacobian matrix J. Assuming that the estimated external force is denoted by F and a vector indicating the transmission torque of each axis 3*a* is denoted by τ, the calculation of the estimated external force F is expressed by $F=J(\theta)^{-1}\tau$. As described above, the Jacobian matrix J is defined based on the vector θ of the feedback position.

In step S226, the robot control unit 30 controls the robot 3 based on the estimated external force. The step S226 is the same as the step S214.

As indicated by step S227, the robot control system 2 may repeat the steps S221 to S226 until the predetermined process ends. For example, the robot control system 2 repeats the steps S221 to S226 at predetermined intervals. With respect to the repeated step S221, the disturbance torque estimation system 10 again executes the processing flow S1A or S1B to calculate the disturbance torque. In the repeated step S224, the matrix setting unit 224 updates the Jacobian matrix J based on a newly obtained feedback positions and the structural parameter. This update may change a matrix element of at least part of the Jacobian matrix J.

As described above, a robot control system according to an aspect of the present disclosure includes circuitry configured to: acquire a plurality of disturbance torques and a plurality of axis positions for a plurality of axes of a robot, wherein the plurality of disturbance torques corresponds to the plurality of axis positions, and wherein the plurality of disturbance torques and the plurality of axis positions correspond to a particular motion of the robot; transmit input data to a learned model for external force, wherein the input data includes the plurality of disturbance torques or the plurality of axis positions; receive output data from the learned model for external force, wherein the output data includes transmission torque data or external force data; calculate an estimated external force having acted on an end effector of the robot based on the output data; and control the robot based on the estimated external force.

A method for controlling a robot according to an aspect of the present disclosure includes: acquiring a plurality of disturbance torques and a plurality of axis positions for a plurality of axes of a robot, wherein the plurality of disturbance torques corresponds to the plurality of axis positions, and wherein the plurality of disturbance torques and the plurality of axis positions correspond to a particular motion of the robot; transmitting input data to a learned model for external force, wherein the input data includes the plurality of disturbance torques or the plurality of axis positions; receiving output data from the learned model for external force, wherein the output data includes transmission torque data or external force data; calculating an estimated external force having acted on an end effector of the robot based on the output data; and controlling the robot based on the estimated external force.

A non-transitory computer-readable storage medium according to an aspect of the present disclosure stores processor-executable instructions to: acquire a plurality of disturbance torques and a plurality of axis positions for a plurality of axes of a robot, wherein the plurality of disturbance torques corresponds to the plurality of axis positions, and wherein the plurality of disturbance torques and the plurality of axis positions correspond to a particular motion of the robot; transmit input data to a learned model for external force, wherein the input data includes the plurality of disturbance torques or the plurality of axis positions; receive output data from the learned model for external force, wherein the output data includes transmission torque data or external force data; calculate an estimated external force having acted on an end effector of the robot based on the output data; and control the robot based on the estimated external force.

An estimation system according to an aspect of the present disclosure includes circuitry configured to execute estimation processing based on a plurality of disturbance torques and a plurality of axis positions corresponding to a plurality of axes of a robot to calculate an external force having affected on an end effector of the robot as an estimated external force, wherein the circuitry is configured to execute, as at least part of the estimation processing, calculation by a learned model for external force that receives at least one of the plurality of disturbance torques and the plurality of axis positions as an input.

In such aspects, since the learned model is introduced to estimate the external force having affected to the end effector of the robot, the external force may be more accurately estimated. By using the estimated external force, the robot may be controlled more accurately. In some examples, such high precision control may be achieved without using a force sensor.

In some examples, the circuitry may be configured to transmit the plurality of disturbance torques as the input data to the learned model for external force.

In some examples, the learned model for external force may receive the plurality of disturbance torques as the input data, calculate, for the plurality of axes, a plurality of transmission torques that are transmitted to the end effector, generate the transmission torque data indicating the plurality of transmission torques, and transmit the transmission torque data as the output data, and the circuitry may be configured to: transmit the plurality of disturbance torques as the input data to the learned model for external force; and receive the transmission torque data indicating the plurality of transmission torques from the learned model for external force. By calculating the transmission torque of each axis using the learned model and calculating the estimated external force based on the transmission torque, the external force may be estimated more accurately.

In some examples, the learned model for external force may include a neural network generated by machine learning using training data based on a past operation of the robot. It is difficult to calculate the transmission efficiency of the disturbance torque affecting the external force that affects on the end effector. By introducing the neural network, the transmission efficiency may be more appropriately reflected in the learned model for external force. As a result, the external force may be estimated more accurately.

In some examples, the learned model for external force may calculate the plurality of transmission torques reflecting a transmission efficiency of each of the plurality of disturbance torques. Since the learned model absorbs the transmission efficiency that is difficult to calculate accurately, the external force may be estimated more accurately.

In some examples, the circuitry may be configured to: set a Jacobian matrix based on the plurality of axis positions and a structural parameter indicating a structure of the robot; and calculate the estimated external force based on the plurality of transmission torques and the Jacobian matrix. By using the Jacobian matrix in which the axis position and the structural parameter of the robot are considered, the external force may be estimated more accurately.

In some examples, the circuitry may be configured to: optimize the structural parameter based on a difference between the estimated external force and an actual external force that is an external force having actually affected on the end effector; and update the Jacobian matrix based on the optimized structural parameter. Since the accuracy of the Jacobian matrix is further improved by optimizing the structural parameter, the external force may be estimated more accurately.

In some examples, the circuitry may be configured to optimize the structural parameter indicating a deviation from a design value related to a structure of the robot. Since the Jacobian matrix reflecting the difference amount from the design value is obtained, the external force may be estimated more accurately in consideration of a current state of the robot that has been changed from the structure at the time of design.

In some examples, the circuitry may be configured to execute machine learning based on training data indicating combinations of a plurality of past disturbance torques, a plurality of past axis positions, and a past actual external force that is affected on the end effector to generate the learned model for external force for calculating the plurality of transmission torques. With this configuration, the learned model used to calculate the transmission torque may be prepared in the robot control system.

In some examples, the circuitry may be configured to: calculate ground truth values of the plurality of transmission torques based on the plurality of past axis positions and past actual external force, for each of the plurality of combinations; and execute the machine learning based on the plurality of past disturbance torques indicated by the training data and the ground truth values of the plurality of transmission torques to generate the learned model for external force. Since the ground truth value of the transmission torque that is difficult to measure is obtained by the calculation, the ground truth value may be obtained more easily.

In some examples, the learned model for external force may receive the plurality of disturbance torques and the plurality of axis positions as the input data, and transmit the estimated external force, and the transmitting may include transmitting the plurality of disturbance torques and the plurality of axis positions as the input data to the learned model for external force, and the receiving may include receiving the external force data indicating the estimated external force from the learned model for external force. Since the entire estimation processing is realized by the learned model, the external force may be estimated more accurately while simplifying the configuration related to the estimation processing.

In some examples, the method may further includes executing machine learning based on training data indicating combinations of a plurality of past disturbance torques, a plurality of past axis positions, and a past actual external force that is affected on the end effector to generate the learned model for external force for calculating the estimated external force. With this configuration, the learned model used to calculate the estimated external force may be prepared in the robot control system.

In some examples, the storage medium may further store processor-executable instructions to: access a storage device configured to store a reference torque model reflecting a relationship between a trajectory of the end effector and a plurality of reference torques corresponding to the plurality of axes of the robot that moves along the trajectory without being affected by a disturbance; and calculate, based on the reference torque model and a plurality of actual torques corresponding to the plurality of axes of the robot that moves along an actual trajectory, the plurality of disturbance torques in the actual trajectory in order to acquire the plurality of disturbance torques. By using the reference torque model reflecting the relationship between the trajectory of the end effector and the reference torque, the disturbance torque corresponding to the actual trajectory may be accurately obtained from the actual torque and the external force may be estimated more accurately by using that disturbance torque.

In some examples, the storage medium may further store processor-executable instructions to: identify the plurality of reference torques based on the reference torque model and posture information indicating a posture of the robot in the actual trajectory; and calculate a difference between the actual torque and the reference torque as the disturbance torque, for each of the plurality of axes. The disturbance torque may be more accurately obtained by identifying the reference torque corresponding to the posture of the robot in the actual trajectory and calculating the difference between the reference torque and the actual torque.

In some examples, the reference torque model may be a learned model for torque that receives the plurality of axis positions corresponding to the plurality of axes of the robot in the actual trajectory and calculates the plurality of reference torques, and the storage medium may further store processor-executable instructions to: transmit the plurality of axis positions to the learned model for torque to calculate the plurality of reference torques; and receive the plurality of reference torques from the learned model for torque. By realizing the reference torque model by the learned model, even in a case where the actual trajectory of the robot deviates from a goal, the disturbance torque corresponding to the actual trajectory may be obtained more accurately. For example, even in a case where the actual trajectory of the robot is deviated from the goal along the force control axis direction, the disturbance torque may be accurately calculated.

In some examples, the storage medium may further store processor-executable instructions to execute machine learning based on training data indicating combinations of a plurality of past axis positions and a plurality of past reference torques to generate the learned model for torque. With this configuration, the learned model used to calculate the reference torque may be prepared in the robot control system.

In some examples, the reference torque model may include, for each of a plurality of candidate positions of the end effector including the trajectory, a relationship between the candidate position and the plurality of reference torques, and the storage medium may further store processor-executable instructions to: select at least one candidate position corresponding to an actual position of the end effector indicated by the posture information, from the plurality of candidate positions; and identify the plurality of reference torques based on the selected at least one candidate position and the reference torque model. Since the reference torque is associated with each of the plurality of candidate positions in advance, the disturbance torque corresponding to the actual trajectory of the end effector may be estimated from that corresponding relationship.

In some examples, each of the plurality of candidate positions may be included in one of a plurality of candidate trajectories that are set to positions different from each other in a force control axis direction of the robot, and the storage medium may further store processor-executable instructions to select one candidate trajectory corresponding to an actual position of the end effector in the force control axis direction. By setting such a candidate position, the disturbance torque of the end effector that operates while applying force to the workpiece may be estimated more accurately.

An estimation system according to an aspect of the present disclosure includes: a storage configured to store a reference torque model reflecting a relationship between a trajectory of an end effector of a robot and a plurality of reference torques corresponding to a plurality of axes of the robot that moves along the trajectory without being affected by a disturbance; and circuitry configured to calculate, based on the reference torque model and a plurality of actual torques corresponding to the plurality of axes of the robot that moves along an actual trajectory, a plurality of disturbance torques corresponding to the plurality of axes in the actual trajectory.

According to this aspect, by using the disturbance torque model reflecting the relationship between the trajectory of the end effector and the reference torque, the disturbance torque corresponding to the actual trajectory of the end effector may be accurately obtained from the actual torque.

It is to be understood that not all aspects, advantages and features described herein may necessarily be achieved by, or included in, any one particular example. Indeed, having described and illustrated various examples herein, it should be apparent that other examples may be modified in arrangement and detail.

The configurations of both the robot control system and the estimation system according to the present disclosure are not limited to the above examples. For example, the robot control system may include the external force estimation system and the robot control unit without including the disturbance torque estimation system. In this case, the robot control system acquires the disturbance torque from an external computer system, calculates the estimated external force based on the disturbance torque, and controls the robot based on the estimated external force. Both the disturbance torque estimation system and the external force estimation system may be provided independently. The disturbance torque estimation system may not include the torque learning unit, and the external force estimation system may not include the external force learning unit. That is, both the learned model for torque and the learned model for external force may be generated by an external computer system and transplanted to the corresponding estimation system. The optimization unit for optimizing the structural parameter may be omitted, and in this case, the external force estimation system may use a structured parameter optimized by an external computer system.

In the above examples, the external force estimation system according to the present disclosure is used for the robot control, but the external force estimation system may be used for another purpose. The external force estimation system may be used to manage the progress of a process on a workpiece, and may be used, for example, to check the progress of polishing a workpiece.

In the above examples, the disturbance torque estimation system according to the present disclosure is used for calculating the estimated external force, but the disturbance torque estimation system may be used for another purpose. For example, the disturbance torque estimation system may replace at least part of the function of a torque sensor or may be used to detect contact between a device such as a robot and another object.

The robot control system and the estimation system according to the present disclosure may calculate the transmission torque of each axis by optimization such as Bayesian optimization instead of the learned model. Alternatively, the robot control system and the estimation system according to the present disclosure executes the process of calculating the estimated external force based on the transmission torque of each axis with a learned model such as a neural network.

The learned model for torque may be a calculation model that receives the plurality of feedback positions and the plurality of actual torques corresponding to the plurality of axes of the robot in the actual trajectory as an input and calculates the plurality of reference torques corresponding to the plurality of axes.

In the above examples, the data table 129 is shown as an example of the reference torque model including the relationship between the candidate position and the plurality of reference torques for each of the plurality of candidate positions of the end effector. The reference torque model including that relationship may be realized by a method other than the data table, and may be defined by a predetermined function, for example.

Although the robot control system is separated from the motor control device in the above examples, the robot control system may be incorporated into the motor control device. Alternatively, the robot control system may be incorporated into a host controller that outputs commands to the motor control device.

The hardware configuration of the system is not limited to an aspect in which each functional module is realized by executing a program. For example, at least part of the functional modules described above may be configured by logic circuitry specialized for the functions, or may be configured by an application specific integrated circuit (ASIC) in which the logic circuitry is integrated.

The processing procedure of the method executed by at least one processor is not limited to the above examples. For example, some of the steps or processes described above may be omitted, or the steps may be executed in a different order. Further, any two or more steps among the above-described steps may be combined, or part of the steps may be modified or deleted. Alternatively, another step may be executed in addition to the above-described steps.

In a case where a magnitude relationship between two numerical values is compared in a computer system or a computer, either of two criteria of "equal to or greater than" and "greater than" may be used, and either of two criteria of "equal to or less than" and "less than" may be used.

We claim all modifications and variations coming within the spirit and scope of the subject matter claimed herein.

The following appendices are provided by way of further illustrative examples.

(Appendix 1) A robot control system comprising:

an external force estimation unit configured to execute estimation processing based on a plurality of disturbance torques and a plurality of axis positions corresponding to a plurality of axes of a robot to calculate an external force having affected on an end effector of the robot as an estimated external force; and a robot control unit configured to control the robot based on the estimated external force, wherein the external force estimation unit is configured to execute, as at least part of the estimation processing, calculation by a learned model for external force that receives at least one of the plurality of disturbance torques and the plurality of axis positions as an input.

(Appendix 2) The robot control system according to Appendix 1, wherein the learned model for external force calculates a result reflecting a transmission torque of each of the plurality of disturbance torques, and wherein the external force estimation unit is configured to input at least the plurality of disturbance torques into the learned model for external force.

(Appendix 3) The robot control system according to Appendix 2, wherein the learned model for external force includes a neural network generated by machine learning using training data based on an operation of the robot, and wherein the external force estimation unit is configured to execute calculation by the neural network, as at least part of the estimation processing.

(Appendix 4) The robot control system according to Appendix 2 or 3, wherein the learned model for external force calculates, for each of the plurality of axes, a transmission torque that is a torque transmitted to the end effector, based on the plurality of disturbance torques, and wherein the external force estimation unit is configured to:

input the plurality of disturbance torques into the learned model for external force to calculate a plurality of the transmission torques corresponding to the plurality of axes; and calculate the estimated external force based on the plurality of transmission torques.

(Appendix 5) The robot control system according to Appendix 4, further comprising a matrix setting unit configured to set a Jacobian matrix based on the plurality of axis positions and a structural parameter indicating a structure of the robot, wherein the external force estimation unit is configured to calculate the estimated external force based on the plurality of transmission torques and the Jacobian matrix.

(Appendix 6) The robot control system according to Appendix 5, further comprising an optimization unit configured to optimize the structural parameter based on a difference between the estimated external force and an actual external force that is an external force having actually affected on the end effector, wherein the matrix setting unit is configured to update the Jacobian matrix based on the optimized structural parameter.

(Appendix 7) The robot control system according to Appendix 6, wherein the optimization unit is configured to optimize the structural parameter indicating a difference amount from a design value related to a structure of the robot.

(Appendix 8) The robot control system according to any one of Appendices 4 to 7, further comprising an external force learning unit configured to execute machine learning based on training data indicating a plurality of combinations of the plurality of disturbance torques, the plurality of axis positions, and an actual external force that is an external force having actually affected on the end effector to generate the learned model for external force for calculating the plurality of transmission torques.

(Appendix 9) The robot control system according to Appendix 8, wherein the external force learning unit is configured to:

calculate ground truth values of the plurality of transmission torques based on the plurality of axis positions and the actual external force, for each of the plurality of combinations; and execute the machine learning based on the plurality of disturbance torques indicated by the training data and the ground truth values of the plurality of transmission torques to generate the learned model for external force.

(Appendix 10) The robot control system according to Appendix 1 or 2, wherein the learned model for external force receives the plurality of disturbance torques and the plurality of axis positions as inputs and calculates the estimated external force, and wherein the external force estimation unit is configured to input the plurality of disturbance torques and the plurality of axis positions into the learned model for external force to calculate the estimated external force.

(Appendix 11) The robot control system according to Appendix 10, further comprising an external force learning unit configured to execute machine learning based on training data indicating a plurality of combinations of the plurality of disturbance torques, the plurality of axis positions, and an actual external force that is an external force having actually affected on the end effector to generate the learned model for external force for calculating the estimated external force.

(Appendix 12) The robot control system according to any one of Appendices 1 to 11, further comprising:

a storage unit configured to store a reference torque model reflecting a relationship between a trajectory of the end effector and a plurality of reference torques corresponding to the plurality of axes of the robot that moves along the trajectory without being affected by a disturbance; and a disturbance torque estimation unit configured to calculate, based on the reference torque model and a plurality of actual torques corresponding to the plurality of axes of the robot that moves along an actual trajectory, the plurality of disturbance torques in the actual trajectory.

(Appendix 13) The robot control system according to Appendix 12, wherein the disturbance torque estimation unit is configured to:

identify the plurality of reference torques based on the reference torque model and posture information indicating a posture of the robot in the actual trajectory; and calculate a difference between the actual torque and the reference torque as the disturbance torque, for each of the plurality of axes.

(Appendix 14) The robot control system according to Appendix 13, wherein the reference torque model is a learned model for torque that receives at least the plurality of axis positions corresponding to the plurality of axes of the robot in the actual trajectory as an input and calculates the plurality of reference torques, and wherein the disturbance torque estimation unit is configured to input at least the plurality of axis positions into the learned model for torque to calculate the plurality of reference torques.

(Appendix 15) The robot control system according to Appendix 14, further comprising a torque learning unit configured to execute machine learning based on training data indicating a plurality of combinations of the plurality of axis positions and the plurality of reference torques to generate the learned model for torque.

(Appendix 16) The robot control system according to Appendix 13, wherein the reference torque model includes, for each of a plurality of candidate positions of the end effector including the trajectory, a relationship between the candidate position and the plurality of reference torques, and wherein the disturbance torque estimation unit is configured to:

select at least one candidate position corresponding to an actual position of the end effector indicated by the posture information, from the plurality of candidate positions; and identify the plurality of reference torques based on the selected at least one candidate position and the reference torque model.

(Appendix 17) The robot control system according to Appendix 16, wherein each of the plurality of candidate positions is included in one of a plurality of candidate trajectories that are set to positions different from each other in a force control axis direction of the robot, and wherein the disturbance torque estimation unit is configured to select the one candidate trajectory corresponding to an actual position of the end effector in the force control axis direction.

(Appendix 18) A robot control method executed by a robot control system including at least one processor, the method comprising:

an external force estimation step of executing estimation processing based on a plurality of disturbance torques and a plurality of axis positions corresponding to a plurality of axes of a robot to calculate an external force having affected on an end effector of the robot as an estimated external force; and a robot control step of controlling the robot based on the estimated external force, wherein the external force estimation step includes executing, as at least part of the estimation processing, calculation by a learned model for external force that receives at least one of the plurality of disturbance torques and the plurality of axis positions as an input.

(Appendix 19) A robot control program causing a computer to execute:

an external force estimation step of executing estimation processing based on a plurality of disturbance torques and a plurality of axis positions corresponding to a plurality of axes of a robot to calculate an external force having affected on an end effector of the robot as an estimated external force; and a robot control step of controlling the robot based on the estimated external force, wherein the external force estimation step includes executing, as at least part of the estimation processing, calculation by a learned model for external force that receives at least one of the plurality of disturbance torques and the plurality of axis positions as an input.

(Appendix 20) An estimation system comprising an external force estimation unit configured to execute estimation processing based on a plurality of disturbance torques and a plurality of axis positions corresponding to a plurality of axes of a robot to calculate an external force having affected on an end effector of the robot as an estimated external force, wherein the external force estimation unit is configured to execute, as at least part of the estimation processing, calculation by a learned model for external force that receives at least one of the plurality of disturbance torques and the plurality of axis positions as an input.

(Appendix 21) An estimation system comprising:
a storage unit configured to store a reference torque model reflecting a relationship between a trajectory of an end effector of a robot and a plurality of reference torques corresponding to a plurality of axes of the robot that moves along the trajectory without being affected by a disturbance; and
a disturbance torque estimation unit configured to calculate, based on the reference torque model and a plurality of actual torques corresponding to the plurality of axes of the robot that moves along an actual trajectory, a plurality of disturbance torques corresponding to the plurality of axes in the actual trajectory.

What is claimed is:

1. A robot control system comprising circuitry configured to:
acquire a plurality of disturbance torques and a plurality of axis positions for a plurality of axes of a robot, wherein the plurality of disturbance torques correspond to the plurality of axis positions, and wherein the plurality of disturbance torques and the plurality of axis positions correspond to a particular motion of the robot;
transmit input data to a learned model for external force, wherein the input data includes the plurality of disturbance torques or the plurality of axis positions;
receive output data from the learned model for external force, wherein the output data includes transmission torque data;
calculate an estimated external force having acted on an end effector of the robot based on the output data; and
control the robot based on the estimated external force, wherein the learned model for external force is configured to:
receive the plurality of disturbance torques as the input data;
calculate, for the plurality of axes, a plurality of transmission torques based on the plurality of disturbance torques, wherein each of the plurality of transmission torques is a torque transmitted from an axis of the robot to the end effector of the robot;
generate the transmission torque data indicating the plurality of transmission torques; and
transmit the transmission torque data as the output data to the circuitry, and wherein the circuitry is configured to:
transmit the plurality of disturbance torques as the input data to the learned model for external force;
receive the transmission torque data indicating the plurality of transmission torques from the learned model for external force; and
calculate the estimated external force based on the plurality of transmission torques indicated by the transmission torque data.

2. The robot control system according to claim 1, wherein the learned model for external force includes a neural network generated by machine learning using training data based on a past operation of the robot.

3. The robot control system according to claim 1, wherein the learned model for external force calculates the plurality of transmission torques reflecting a transmission efficiency of each of the plurality of disturbance torques.

4. The robot control system according to claim 1, wherein the circuitry is configured to:
set a Jacobian matrix based on the plurality of axis positions and a structural parameter indicating a structure of the robot; and calculate the estimated external force based on the plurality of transmission torques and the Jacobian matrix.

5. The robot control system according to claim 4, wherein the circuitry is configured to:
optimize the structural parameter based on a difference between the estimated external force and an actual external force that is an external force having actually affected on the end effector; and
update the Jacobian matrix based on the optimized structural parameter.

6. The robot control system according to claim 5, wherein the circuitry is configured to optimize the structural parameter indicating a deviation from a design value related to a structure of the robot.

7. The robot control system according to claim 1, wherein the circuitry is configured to execute machine learning based on training data indicating combinations of a plurality of past disturbance torques, a plurality of past axis positions, and a past actual external force that is affected on the end effector to generate the learned model for external force for calculating the plurality of transmission torques.

8. The robot control system according to claim 7, wherein the circuitry is configured to:
calculate ground truth values of the plurality of transmission torques based on the plurality of past axis positions and the past actual external force, for each of the plurality of combinations; and
execute the machine learning based on the plurality of past disturbance torques indicated by the training data and the ground truth values of the plurality of transmission torques to generate the learned model for external force.

9. A method for controlling a robot, the method comprising:
acquiring a plurality of disturbance torques and a plurality of axis positions for a plurality of axes of a robot, wherein the plurality of disturbance torques correspond to the plurality of axis positions, and wherein the plurality of disturbance torques and the plurality of axis positions correspond to a particular motion of the robot;
transmitting input data to a learned model for external force, wherein the input data includes the plurality of disturbance torques and the plurality of axis positions;
receiving output data from the learned model for external force, wherein the output data includes an estimated external force having acted on an end effector of the robot; and
controlling the robot based on the estimated external force,
wherein the learned model for external force is configured to:
receive the plurality of disturbance torques and the plurality of axis positions as the input data;
calculate the estimated external force based on the plurality of disturbance torques and the plurality of axis positions; and
transmit the estimated external force as the output data to at least one processor executing the method.

10. A non-transitory computer-readable storage medium storing processor-executable instructions to:
acquire a plurality of disturbance torques and a plurality of axis positions for a plurality of axes of a robot, wherein the plurality of disturbance torques correspond to the plurality of axis positions, and wherein the plurality of disturbance torques and the plurality of axis positions correspond to a particular motion of the robot;

transmit input data to a learned model for external force, wherein the input data includes the plurality of disturbance torques or the plurality of axis positions;

receive output data from the learned model for external force, wherein the output data includes transmission torque data;

calculate an estimated external force having acted on an end effector of the robot based on the output data; and control the robot based on the estimated external force, wherein the learned model for external force is configured to:

receive the plurality of disturbance torques as the input data;

calculate, for the plurality of axes, a plurality of transmission torques based on the plurality of disturbance torques, wherein each of the plurality of transmission torques is a torque transmitted from an axis of the robot to the end effector of the robot;

generate the transmission torque data indicating the plurality of transmission torques; and transmit the transmission torque data as the output data to at least one processor, and wherein the processor-executable instructions further cause the at least one processor to:

transmit the plurality of disturbance torques as the input data to the learned model for external force;

receive the transmission torque data indicating the plurality of transmission torques from the learned model for external force; and calculate the estimated external force based on the plurality of transmission torques indicated by the transmission torque data.

11. The method according to claim 9, further comprising executing machine learning based on training data indicating combinations of a plurality of past disturbance torques, a plurality of past axis positions, and a past actual external force that is affected on the end effector to generate the learned model for external force for calculating the estimated external force.

12. The storage medium according to claim 10, further storing processor-executable instructions to:

access a storage device configured to store a reference torque model reflecting a relationship between a trajectory of the end effector and a plurality of reference torques corresponding to the plurality of axes of the robot that moves along the trajectory without being affected by a disturbance; and calculate, based on the reference torque model and a plurality of actual torques corresponding to the plurality of axes of the robot that moves along an actual trajectory, the plurality of disturbance torques in the actual trajectory in order to acquire the plurality of disturbance torques.

13. The storage medium according to claim 12, further storing processor-executable instructions to:

identify the plurality of reference torques based on the reference torque model and posture information indicating a posture of the robot in the actual trajectory; and calculate a difference between the actual torque and the reference torque as the disturbance torque, for each of the plurality of axes.

14. The storage medium according to claim 13, wherein the reference torque model is a learned model for torque that receives the plurality of axis positions corresponding to the plurality of axes of the robot in the actual trajectory and calculates the plurality of reference torques, and wherein the storage medium further stores processor-executable instructions to:

transmit the plurality of axis positions to the learned model for torque to calculate the plurality of reference torques; and receive the plurality of reference torques from the learned model for torque.

15. The storage medium according to claim 14, further storing processor-executable instructions to execute machine learning based on training data indicating combinations of a plurality of past axis positions and a plurality of past reference torques to generate the learned model for torque.

16. The storage medium according to claim 13, wherein the reference torque model includes, for each of a plurality of candidate positions of the end effector including the trajectory, a relationship between the candidate position and the plurality of reference torques, and wherein the storage medium further stores processor-executable instructions to:

select at least one candidate position corresponding to an actual position of the end effector indicated by the posture information, from the plurality of candidate positions; and identify the plurality of reference torques based on the selected at least one candidate position and the reference torque model.

17. The storage medium according to claim 16, wherein each of the plurality of candidate positions is included in one of a plurality of candidate trajectories that are set to positions different from each other in a force control axis direction of the robot, and wherein the storage medium further stores processor-executable instructions to select one candidate trajectory corresponding to an actual position of the end effector in the force control axis direction.

\* \* \* \* \*